US011832688B2

(12) United States Patent
Druskin et al.

(10) Patent No.: US 11,832,688 B2
(45) Date of Patent: Dec. 5, 2023

(54) SYSTEM AND METHOD FOR FORMING CUSTOM INSOLES FOR USE IN FOOTWEAR

(71) Applicant: DIY Custom Insoles LLC, Fort Lauderdale, FL (US)

(72) Inventors: Maoz Druskin, Fort Lauderdale, FL (US); Idan Drouskin, Fort Lauderdale, FL (US); Roi Alon, Fort Lauderdale, FL (US)

(*) Notice: Subject to any disclaimer, the term of this patent is extended or adjusted under 35 U.S.C. 154(b) by 567 days.

(21) Appl. No.: 16/570,804

(22) Filed: Sep. 13, 2019

(65) Prior Publication Data

US 2021/0076778 A1 Mar. 18, 2021

(51) Int. Cl.

| | |
|---|---|
| *A43D 35/00* | (2006.01) |
| *A43D 15/00* | (2006.01) |
| *B29D 35/12* | (2010.01) |
| *A43B 7/28* | (2006.01) |
| *A43B 7/14* | (2022.01) |
| *A43B 17/14* | (2006.01) |
| *B29K 67/00* | (2006.01) |
| *A43B 7/1405* | (2022.01) |

(52) U.S. Cl.
CPC ............... *A43D 15/00* (2013.01); *A43B 7/14* (2013.01); *A43B 7/28* (2013.01); *A43B 17/14* (2013.01); *B29D 35/122* (2013.01); *A43B 7/141* (2013.01); *B29K 2067/003* (2013.01)

(58) Field of Classification Search
CPC ...................................................... A43B 7/28
See application file for complete search history.

(56) References Cited

U.S. PATENT DOCUMENTS

| | | | | |
|---|---|---|---|---|
| 2,547,419 A | * | 4/1951 | Sugarman ................ | A43B 7/28 264/223 |
| 2,917,782 A | * | 12/1959 | Goldwag ................. | A43B 7/28 249/55 |
| 2,955,326 A | * | 10/1960 | Murray .................... | A43B 7/28 264/223 |
| 2,973,529 A | * | 3/1961 | Silverman ................ | A43B 7/28 36/154 |
| 3,320,347 A | * | 5/1967 | Greenawalt .............. | A43B 7/28 264/223 |
| 3,398,221 A | * | 8/1968 | Sherman .................. | A43B 7/28 156/212 |

(Continued)

FOREIGN PATENT DOCUMENTS

WO 2017007533 A1 1/2017

*Primary Examiner* — Jila M Mohandesi
(74) *Attorney, Agent, or Firm* — Gearhart Law LLC; David Postolski

(57) ABSTRACT

Systems and methods for forming a custom fitted shoe insole. The method includes placing a shoe insole template plate proximate a heating element that heats the shoe insole template plate to a temperature sufficient to make it deformable. The method further includes placing the sufficiently heated shoe insole template plate onto a foam structure, placing a foot of a user on the heated shoe insole template plate, and applying foot pressure to the heated shoe insole template plate, causing it to deform to match a topology of the sole of the user's foot. The shoe insole template plate is then removed from the foam structure, cooled and hardened, and inserted into a shoe as the custom fitted shoe insole.

19 Claims, 7 Drawing Sheets

(56) References Cited

U.S. PATENT DOCUMENTS

| | | | | | |
|---|---|---|---|---|---|
| 4,450,122 | A | * | 5/1984 | Gallina | B29D 35/122 264/153 |
| 4,669,142 | A | * | 6/1987 | Meyer | A43B 7/28 36/154 |
| 4,716,662 | A | * | 1/1988 | Bar | A43B 7/28 264/161 |
| 4,747,989 | A | * | 5/1988 | Peterson | A61B 5/1174 264/223 |
| 4,756,096 | A | * | 7/1988 | Meyer | A43B 17/14 36/43 |
| 5,027,461 | A | * | 7/1991 | Cumberland | A61B 5/1074 264/223 |
| 5,578,260 | A | * | 11/1996 | DeSena | A43B 7/28 264/223 |
| 5,593,699 | A | * | 1/1997 | Grassi | A43B 7/28 264/DIG. 30 |
| 6,560,902 | B1 | * | 5/2003 | Eschweiler | A43B 7/142 36/71 |
| 7,384,584 | B2 | * | 6/2008 | Jerome | A61F 5/0111 264/222 |
| 7,472,495 | B2 | * | 1/2009 | Milbourn | A61F 5/14 36/43 |
| 7,516,555 | B2 | * | 4/2009 | Sullivan | A61B 5/4561 600/592 |
| 8,834,141 | B2 | * | 9/2014 | Cooke | A01L 11/00 220/531 |
| 9,662,242 | B2 | * | 5/2017 | Levine | A61F 5/14 |
| 10,182,610 | B2 | * | 1/2019 | Hakkala | A43B 17/14 |
| 10,470,522 | B2 | * | 11/2019 | Jacobsen | B29D 35/08 |
| 2010/0293727 | A1 | | 11/2010 | Hakkala | |
| 2016/0288440 | A1 | * | 10/2016 | Louko | B29D 35/128 |
| 2017/0255185 | A1 | | 9/2017 | Hinshaw | |
| 2019/0022945 | A1 | | 1/2019 | Ordaz | |
| 2019/0261732 | A1 | * | 8/2019 | Hughes | A43B 17/00 |

* cited by examiner

200

```
┌─────────────────────────────────────────────────────────┐
│  HEATING ELEMENT SET TO PREDETERMINED TEMPERATURE       │
│                         205                             │
└─────────────────────────────────────────────────────────┘
                            ↕
┌─────────────────────────────────────────────────────────┐
│  SHOE INSOLE TEMPLATE PLATE PLACED WITHIN HEATING       │
│  ELEMENT UNTIL DESIRED TEMPERATURE REACHED              │
│                         210                             │
└─────────────────────────────────────────────────────────┘
                            ↕
┌─────────────────────────────────────────────────────────┐
│  HEATED SHOE INSOLE TEMPLATE PLATE PLACED               │
│  ON FOAM PILLOW                                         │
│                         215                             │
└─────────────────────────────────────────────────────────┘
                            ↕
┌─────────────────────────────────────────────────────────┐
│  USER PLACES FOOT ON HEATED SHOE INSOLE TEMPLATE PLATE  │
│  AND APPLIES PRESSURE, DEFORMING PLATE                  │
│                         220                             │
└─────────────────────────────────────────────────────────┘
                            ↕
┌─────────────────────────────────────────────────────────┐
│  USER REMOVES FOOT FROM SHOE INSOLE TEMPLATE PLATE      │
│                         225                             │
└─────────────────────────────────────────────────────────┘
                            ↕
┌─────────────────────────────────────────────────────────┐
│  DEFORMED SHOE INSOLE TEMPLATE PLATE IS REMOVED FROM    │
│  FOAM PILLOW AND ALLOWED TO COOL, FORMING FITTED INSOLE │
│                         230                             │
└─────────────────────────────────────────────────────────┘
                            ↕
┌─────────────────────────────────────────────────────────┐
│  FITTED INSOLE IS INSERTED INTO ARTICLE OF FOOTWEAR     │
│  FOR USE                                                │
│                         235                             │
└─────────────────────────────────────────────────────────┘
```

FIG. 6

SYSTEM AND METHOD FOR FORMING CUSTOM INSOLES FOR USE IN FOOTWEAR

CLAIM OF PRIORITY

This application is a United States non-provisional application and claims no priority to any previous patent application.

FIELD OF THE EMBODIMENTS

This invention relates to shoe insoles and, in particular, to systems and methods for forming custom-made insoles for use in footwear.

BACKGROUND OF THE EMBODIMENTS

Shoe insoles are proven effective at supporting the feet better than the use of shoes alone, and they can be incredibly effective at treating common foot conditions that cause pain throughout the body. While over-the-counter insoles are widely accessible and affordable, these insoles offer a one-size-fits-all approach and may actually worsen conditions, given that the insoles are not custom-fit for the users. Custom insoles are really the only way to ensure a proper fit that adequately corrects foot posture.

The issue that arises with commonly sold custom insoles is that they often require a doctor's prescription, making them a timely and expensive option. For at least this reason, an affordable and relatively quick system and method for creating custom insoles is needed.

Examples of related art are described below:

U.S. Pat. No. 4,756,096 generally describes a custom molded insole for supporting the human foot in a ski boot or other footwear. The insole is a one-piece, thin, contoured blank of semi-rigid, bendable, resilient material molded to include the complete detail of the full plantar surface of a foot. The insole provides a four-point contact with a supporting surface or ski boot at the heel, great toe, and at least two spaced metatarsal heads to provide natural balance and proper dynamic positioning of the foot and immediate energy transfer between the foot and various footwear such as a boot/ski when skiing. The patent also generally describes a method for making the custom insole including forming a negative impression of the plantar surface in an impression retaining material by pressing the foot into the material while bearing at least a portion of the body weight on that foot with the impression material firmly supported on a rigid surface. A heated blank of the resilient material is then formed in the impression, preferably using the same foot to press the blank down into the impression. The patent also generally describes a kit for forming the custom insole including at least one piece of impression material and at least one blank of semi-rigid, bendable, resilient material.

U.S. Patent Publication No. 2010/0293727 generally describes individually formed footwear such as shoes and insoles for correcting the feet position and alleviate related problems. The shoe or insole includes at least one layer made of thermoplastic material, which material is advantageously chosen from a group of ABS, PVC, A-PET and PETG. A method for providing Such footwear to a client at a retail store is likewise described.

U.S. Patent Publication No. 2017/0255185 generally describes a system and method for measuring and generating a customized foot orthotic insole that may be inserted into footwear, to reposition the foot to that referenced neutral position or as close to that position as the individual can tolerate. The system/method can scan, manufacture, and dispense the custom insole at an integrated station that can be located in a specialist's office, but also in retail space, malls, airports, etc. The system/method allows a customer to have his or her foot scanned using different types of three dimensional scanning or pressure scanning devices, whereupon the information from the scan(s) is/are fed to a semi-automatic design system, where computer programs and specialized AI algorithms create a custom insole design.

U.S. Patent Publication No. 2019/0022945 generally describes a custom insole and process for fabrication comprised of scanning to map a foot, sending the scan to a remote processing computer and returning a 3D compatible print able file that can render the custom insole in a short time. The foot is preferably not deformed by standing pressure during the scan. The podiatrist taking the scan can amend the electronic file to add or remove material from the yet-to-be-made custom insole to tailor the fit to the specific patient.

International Patent Publication No. WO2017/007533A1 generally describes a shaped footwear device intended to be used as a supportive insole or orthotic and a system and methods for making the same. The footwear device includes a top foam layer, a light-cured composite material layer, and a bottom textile layer. The footwear device is created by conforming a pre-cured insole assembly to the plantar surface of a foot or foot mold and then exposing the pre-cured insole assembly to light to create a shaped footwear device with a light-cured composite material support plate.

None of the art described above addresses all of the issues that the present invention does.

SUMMARY OF THE EMBODIMENTS

According to an aspect of the present invention, a method for forming a custom fitted shoe insole is provided. The method includes placing a shoe insole template plate into a preheated heating element, wherein the heating element is configured to heat the shoe insole template plate to a desired temperature. The method further includes placing the heated shoe insole template plate onto a foam structure, placing a foot of a user on the heated shoe insole template plate, applying foot pressure to the heated shoe insole template plate, causing the shoe insole template plate to deform to a shape of the foot of the user, and removing the shoe insole template plate from the foam structure, enabling the shoe insole template plate to cool and harden in shape as the custom fitted shoe insole.

It is an object of the present invention to provide the method for forming a custom fitted shoe insole, wherein the method further includes heating the heating element to a predetermined temperature.

It is an object of the present invention to provide the method for forming a custom fitted shoe insole, wherein the predetermined temperature is 200 degrees Fahrenheit.

It is an object of the present invention to provide the method for forming a custom fitted shoe insole, wherein the shoe insole template plate includes a rigid structure core portion.

It is an object of the present invention to provide the method for forming a custom fitted shoe insole, wherein the shoe insole template plate reaches the desired temperature when the rigid structure core portion becomes malleable.

It is an object of the present invention to provide the method for forming a custom fitted shoe insole, wherein the method further includes inserting the custom fitted shoe insole into an article of footwear.

It is an object of the present invention to provide the method for forming a custom fitted shoe insole, wherein the shoe insole template plate is configured to accommodate a left foot or a right foot.

According to another aspect of the present invention, a system for forming a custom fitted shoe insole is provided. The system includes one or more shoe insole template plates, wherein the one or more shoe insole template plates are configured to be heated and deformed, using pressure from a foot of a user, and cool, keeping a shape of the foot of the user, forming the custom fitted insole. The system further includes a foam structure, wherein the foam structure is configured such that the shoe insole template plate is placed upon the foam structure, enabling the user to apply foot pressure to the shoe insole template plate, and a casing configured to house the foam structure.

It is an object of the present invention to provide the system for forming a custom fitted shoe insole, wherein the one or more shoe insole template plates include a rigid structure core portion.

It is an object of the present invention to provide the system for forming a custom fitted shoe insole, wherein the one or more shoe insole template plates include a flexible portion surrounding the rigid structure core portion.

It is an object of the present invention to provide the system for forming a custom fitted shoe insole, wherein the rigid structure core portion is positioned on a heel portion of the one or more shoe insole template plates.

It is an object of the present invention to provide the system for forming a custom fitted shoe insole, wherein each of the one or more shoe insole template plates is configured to accommodate a left foot or a right foot.

It is an object of the present invention to provide the system for forming a custom fitted shoe insole, wherein the casing includes a notched portion configured to instruct the user where to position the one or more shoe insole template plates on the foam structure.

It is an object of the present invention to provide the system for forming a custom fitted shoe insole, wherein the casing includes a material selected from the group consisting of: cardboard; wood; plastic; and metal.

BRIEF DESCRIPTION OF THE DRAWINGS

Embodiments of the present invention will be described with reference to the drawings, in which the same elements in the various figures are identified with the same reference numerals.

FIG. 6 shows a flowchart of a method for forming custom shoe insoles, according to an embodiment of the present invention.

DETAILED DESCRIPTION OF EMBODIMENTS

Reference will now be made to certain exemplary embodiments of the present invention. Such embodiments are provided by way of explanation of the present invention, which is not limited thereto. Those of ordinary skill in the art may appreciate upon reading the present specification and viewing the present drawings that various modifications and variations may be made thereto.

Figure 1:
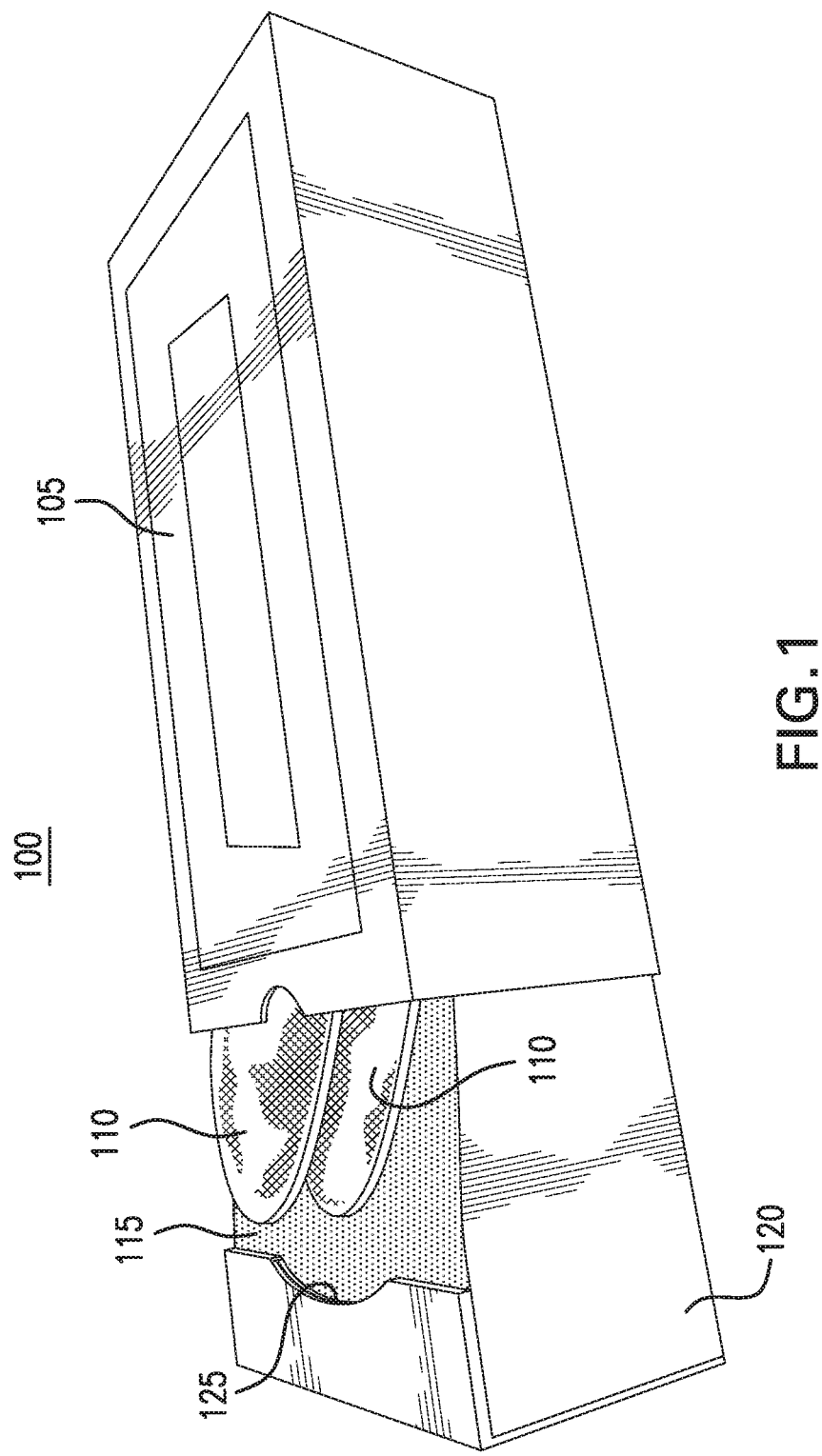
FIG. 1 shows a perspective view of a system for forming custom shoe insoles, according to an embodiment of the present invention.

Referring now to FIG. 1, an exemplary embodiment of a system 100 for forming a custom shoe insole is depicted. The system 100 includes one or more shoe insole template plates 110. The system also includes a housing 120 that contains a soft pillow-like element 115. The housing may also have a notch 125 showing where a shoe insole template plate 110 should be placed when forming a custom fitted shoe insert, as will be described. In embodiments, some or all of the components of the system 100 may be slid into an exterior case 105 to be stored. The cast 105 may comprise cardboard, wood, plastic, metal, and/or any other materials rigid enough to protect the stored components.

Figure 2:
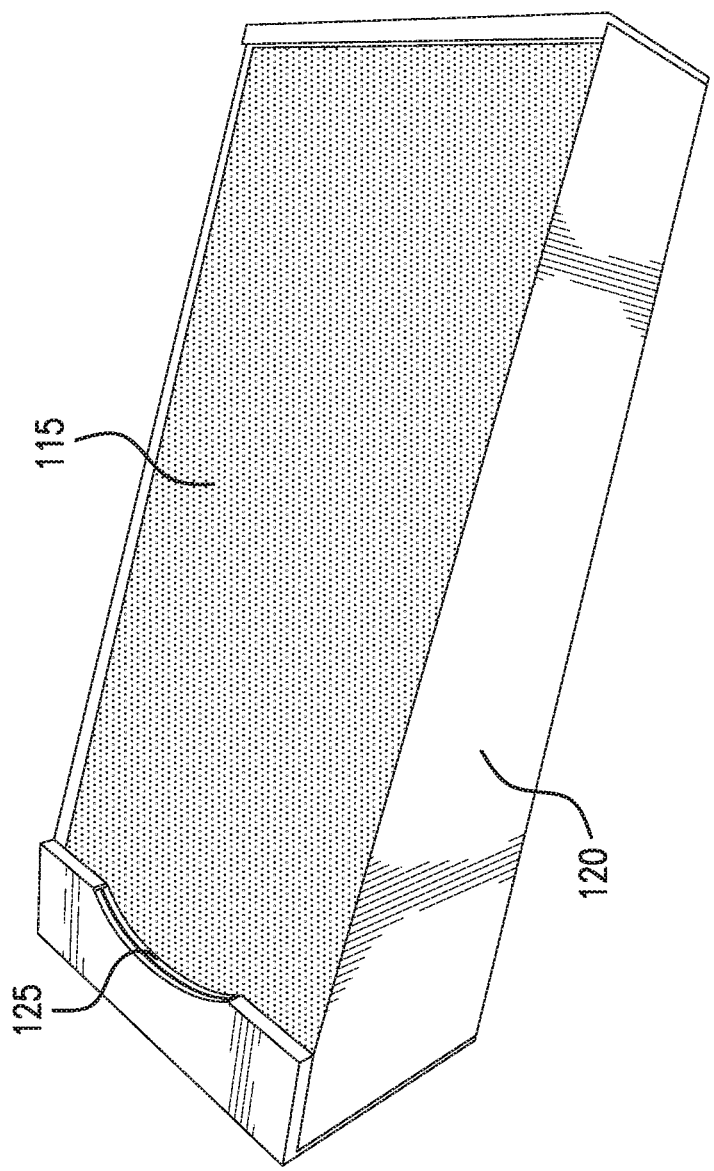
FIG. 2 shows a foam pillow housed within a casing, according to an embodiment of the present invention.

FIG. 2 is a perspective view of the pillow 115 and the housing 120. The pillow may comprise a layer of compressible material such as rubber, an elastomeric plastic, or a rubberized, rigid or stiff, flexible substrate. The housing 120 may also comprise a notch 125 or other marker to indicate to the user where to place a shoe insole template plate 110 as a customized shoe insole is being made, as will be described. The pillow 115 is configured such that, when placed on a level surface such as a floor, a first end of the pillow 115 has a first height, and a second end of the pillow has a second height lower than the first height.

Figure 3:
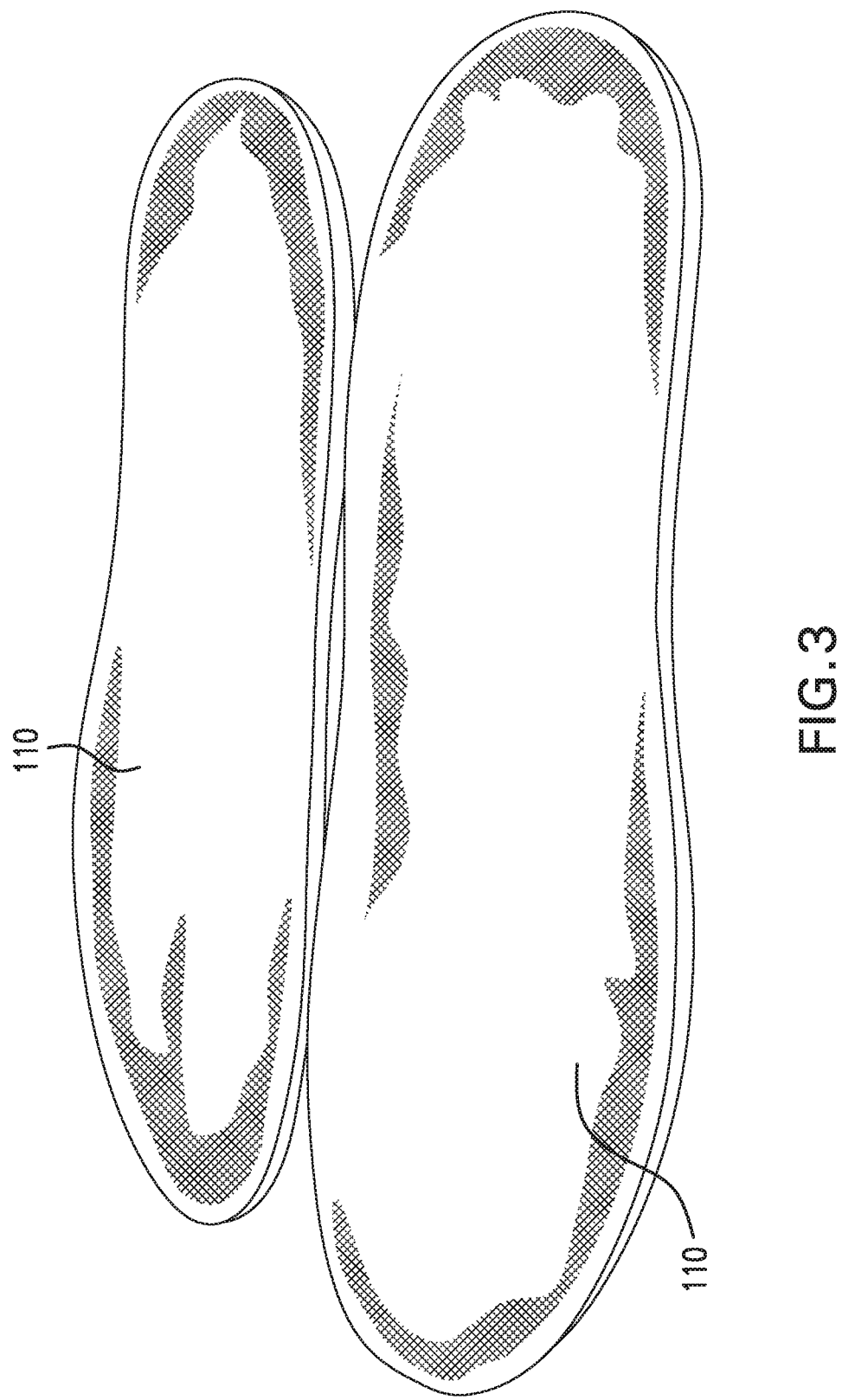
FIG. 3 shows an upper perspective view of a pair of shoe insole template plates, according to an embodiment of the present invention.

FIG. 3 is a perspective view of a pair of shoe insole template plates 110. It is contemplated a pair of shoe insole template plates 110 will be sold together, one of the template plates 110 cut for making a customized shoe insert for a user's left foot, and another cut for the user's right foot. Alternatively, a left or right foot shaped shoe insole template plate 110 may be sold individually, such as to make a replacement or a spare insert.

Figure 4:
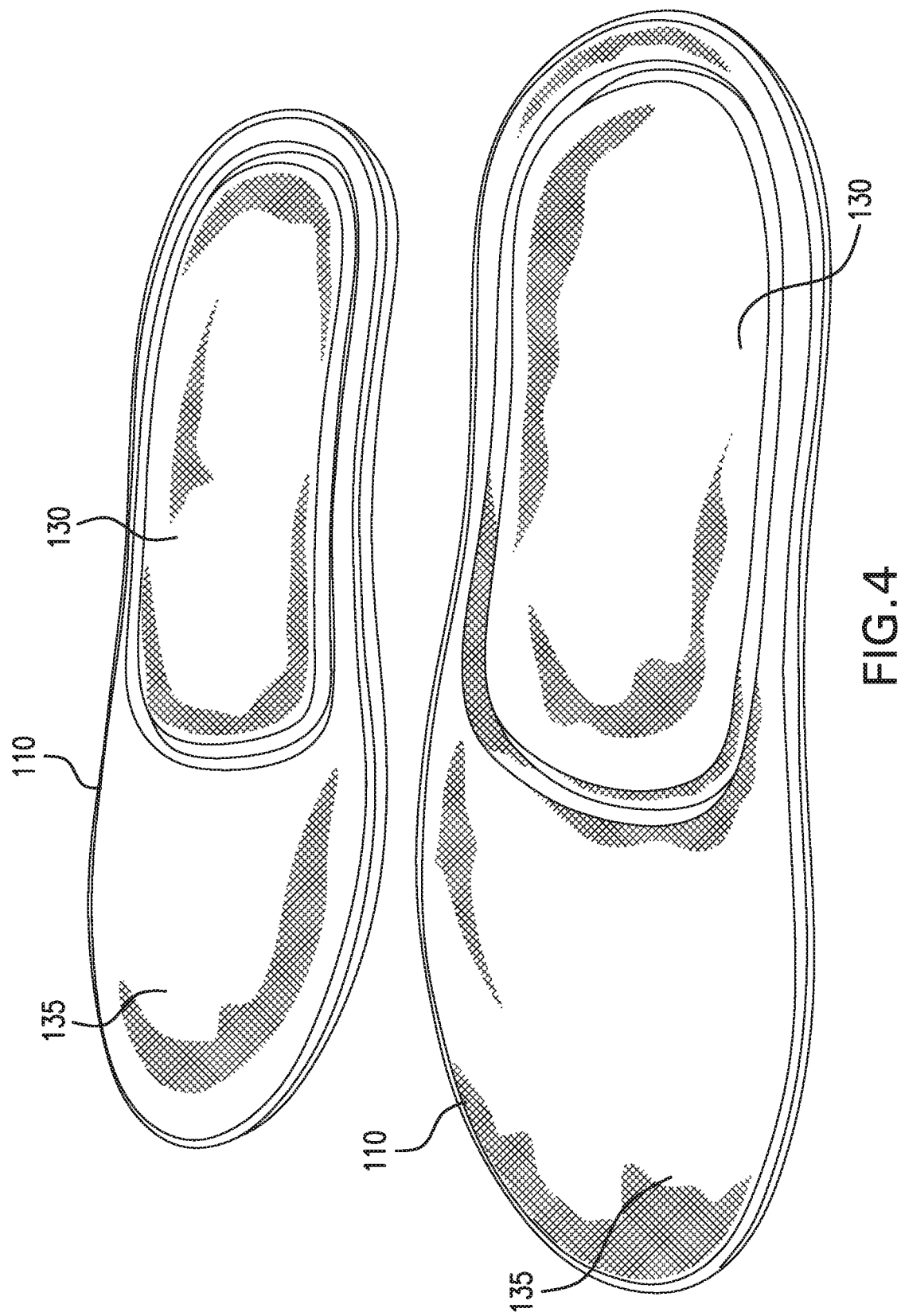
FIG. 4 shows a bottom perspective view of a pair of shoe insole template plates, according to an embodiment of the present invention.

FIG. 4 is a perspective view of another exemplary embodiment of a pair of shoe insole template plates 110. As shown, in this embodiment the shoe insole template plates 110 each include a rigid structure core portion 130 on and/or near the heel of the template plate 110. The shoe insole template plates 110 may also include a flexible material 135 surrounding the rigid structure 130.

Figure 5:
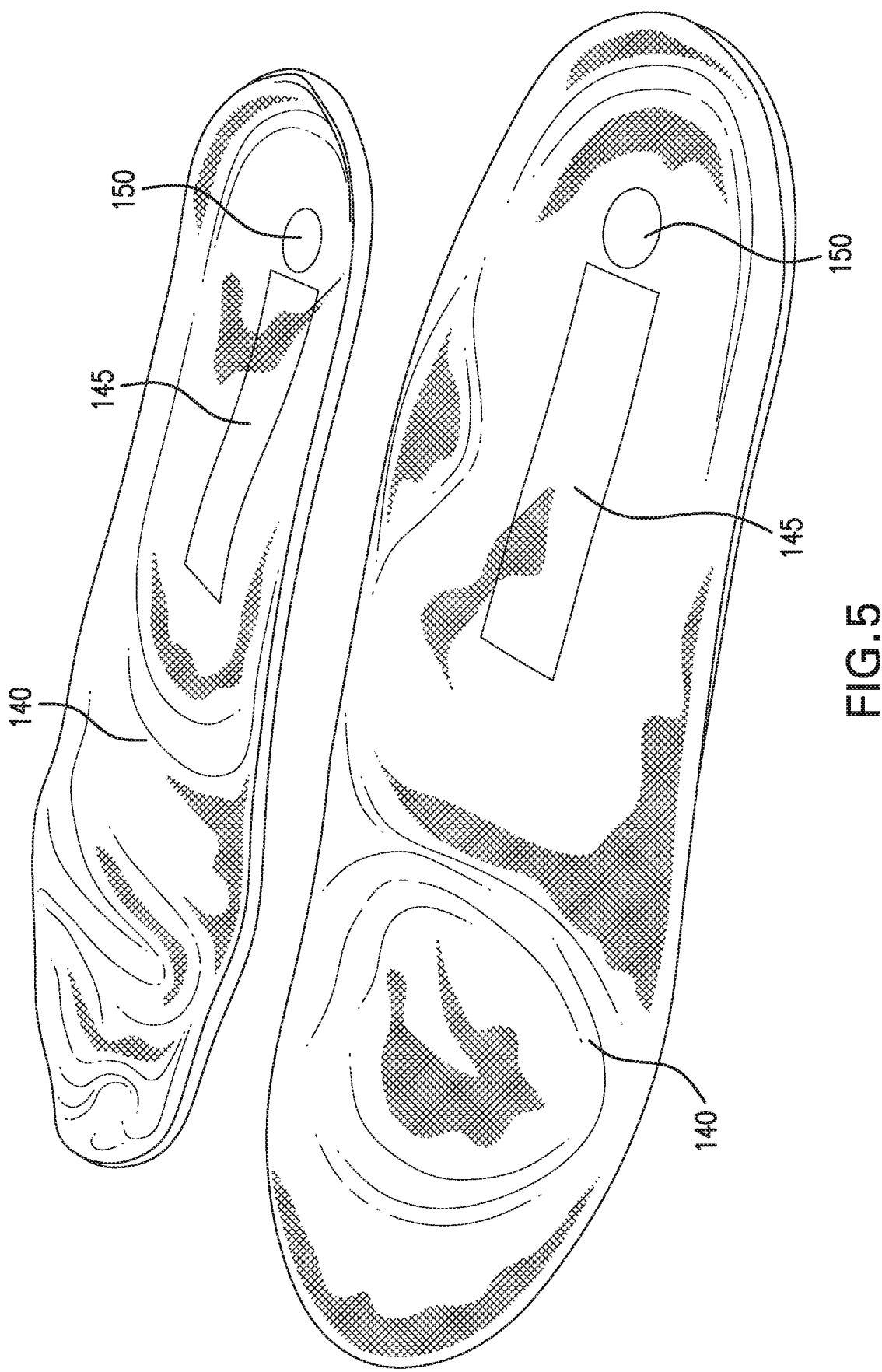
FIG. 5 shows an upper perspective view of a pair of formed shoe insoles, according to an embodiment of the present invention.

FIG. 5 is a perspective view of a pair of customized shoe inserts 140 made from a pair of shoe insole template plates 110. As shown, the shoe insole template plates 110 have been permanently deformed and are now ready to be used as fitted shoe insoles 140. According to an embodiment, the shoe insole 140 and/or template plate 110 may comprise an indicator of the shoe size 150 the custom shoe insole 140 is sized to fit in. The shoe insole 140 and/or template plate 110 may also include a graphical element 145, such as a graphic showing the manufacturer's name or logo.

FIG. 6 is a flowchart showing an exemplary method 200 for forming a custom shoe insole 140, such as the insole shown in FIG. 5. The method begins by heating a heating element to a predetermined temperature sufficient to make the shoe insole template plate 110 deformable, step 205. In an exemplary embodiment, the predetermined temperature is 200 degrees Fahrenheit. However, it is noted that a different predetermined temperature may be used to accomplish the desired effect on the custom shoe insole template plate 110, without departing from the scope of the present invention. In embodiments, the heating element may be an oven or hotplate. However it is noted that any suitable heating element may be used to heat the insole template plate 110 without departing from the scope of the present invention.

The insole template plate 110 is placed in or near the heating element until the template plate 110 reaches a temperature at which the template plate 110 is deformable, step 210. In embodiments, the insole template plate 110 comprises a rigid structure core portion 130 that becomes flexible. After the insole template plate 110 has reached the desired temperature and flexibility, the insole template plate 110 is placed on the foam pillow 115, step 215.

At step 220, the user places their foot onto the heated insole template plate 110 that has been placed onto the foam pillow 115, and applies pressure to the insole template plate 110, such as by standing and putting weight on the foot on the heated insole template plate 110. The foot (whether left or right) should match the shape of the insole template plate 110. The pressure applied by the user causes the heated insole template plate 110 to deform to match the topology of the sole of the user's foot.

At step 225, the user removes their foot from the deformed insole template plate 110, and, at step 230, the deformed insole template plate 110 is removed from the foam pillow 115 and cooled, hardening to permanently retain an upper surface that matches the topology of the user's sole. The deformed and cooled insole template plate 110 forms the custom fitted shoe insole 140. The custom fitted insole 140 can then be inserted into an article of footwear, step 235, to be worn by the user.

Figure 7:
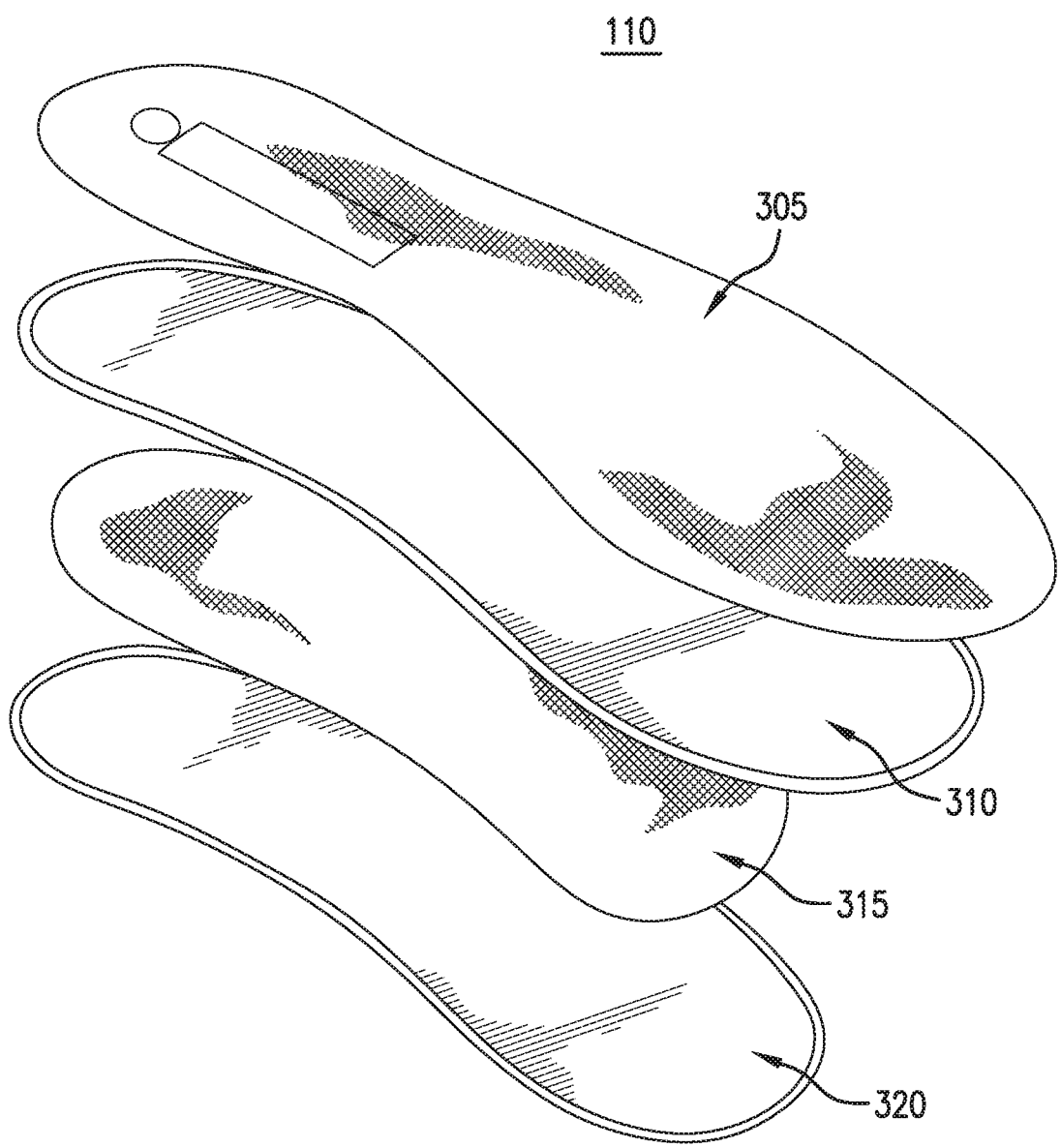
FIG. 7 shows an exploded view of a shoe insole template plate, according to an embodiment of the present invention.

Referring now to FIG. 7, in embodiments the shoe insole template plate 110 may include a plurality of layers. For example, the shoe insole template plate 110 may include one or more of a top layer 305, a comfort layer 310, a functional layer 315, and/or a base layer 320.

In embodiments, the top layer 305 is configured to be breathable and wear-resistant, with a non-slip top surface. The top layer 305 may include, e.g., polyester and/or any other suitable material or materials that provide these properties.

In embodiments, the comfort layer 310 is configured to be wear resistant, soft, and comfortable to the user. In particular, the comfort layer 310 is made of a material that absorbs shocks, such as rubber, ethylene-vinyl acetate (EVA), an elastomer, and/or any other suitable material or materials that provide these properties.

In embodiments, the functional layer 315 provides impact resistance. It may be configured to be environmentally friendly and may include recyclable thermoplastics that have a low and stable melting point. This layer may include, e.g., PETG (ethylene terephthalateco-1,4-cylclohexylenedimethylene terephthalate), and/or any other suitable material or materials that provide these properties. According to an embodiment, the functional layer 315 has a thickness of approximately 2 mm, although any suitable thickness may be used.

In embodiments, the base layer 320 may include, e.g., a nylon fabric and/or other similar material.

When introducing elements of the present disclosure or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the scope of the invention, which is determined by the following claims.

What is claimed is:

1. A method of forming a custom fitted shoe insole, the method comprising:
   heating a shoe insole template plate to a predetermined temperature sufficient to deform the heated shoe insole template plate;
   placing the heated shoe insole template plate onto a foam structure retained inside an angled rectangular housing having opposed rigid side walls, wherein said housing has a trapezium shaped side profile,
   wherein said housing is filled with said foam structure and the foam structure conforms to the shape of said housing, such that the shape of the foam structure side profile matches the trapezium shaped side profile of the housing,
   wherein a top edge of the opposing side walls of said housing slopes down from a higher end of said housing to an opposing lower end of said housing,
   wherein the angled rectangular housing comprises a rectangular lip with an arcuate cutout, said lip extends from the higher end of said housing along a short segment of said sidewalls and covers a portion of said foam structure,
   wherein the arcuate cutout is configured to receive a heel portion of the heated shoe insole template,
   wherein the foam structure slopes downward from the upper end of said housing to the opposing lower end of said housing,
   wherein the housing is strong enough to support a body weight of a user standing with a foot on the foam structure, wherein the rigid side walls limit lateral expansion of the foam structure when the foam structure is deformed in response to pressure applied by the user's foot;
   placing the user's foot on the heated shoe insole template overlying the foam structure such that the user's heel is proximate the upper end of said housing and their toes are proximate the opposing lower end of said housing, wherein the user's foot slopes downward from the upper end to the opposing lower end;
   applying downward pressure to the heated shoe insole template via the user's foot, causing the heated shoe insole template to deform and form a topology that matches a bottom of the user's foot; and
   cooling the shoe insole template so as to harden it with the matching topology, thus forming the custom fitted shoe insole.

2. The method as recited in claim 1, wherein the predetermined temperature is predetermined based on the composition of the shoe insole template plate.

3. The method as recited in claim 2, wherein the shoe insole template plate comprises poly(ethylene terephthalate-co-1,4-cyclohexylenedimethylene terephthalate) (PETG), and the predetermined temperature is 200 degrees Fahrenheit.

4. The method as recited in claim 1, wherein the shoe insole template plate includes a top layer configured to be breathable, wear-resistant, and non-slip.

5. The method as recited in claim 4, wherein the top layer comprises polyester.

6. The method as recited in claim 1, wherein the shoe insole template plate includes a comfort layer configured to be wear-resistant, soft, comfortable to the user, and capable of shock absorption.

7. The method as recited in claim 6, wherein the comfort layer comprises rubber or ethylene-vinyl acetate (EVA).

8. The method as recited in claim 1, further comprising: inserting the custom fitted shoe insole into an article of footwear.

9. The method as recited in claim 1, wherein the shoe insole template plate is configured to accommodate at least one of a left foot and a right foot.

10. An apparatus for creating a custom fitted insole comprising:
an angled rectangular housing with opposing rigid side walls, wherein said housing has a trapezium shaped side profile;
a foam structure retained in said housing, wherein said housing is filled with said foam structure which conforms to the shape of said housing, such that the shape of the foam structure side profile matches the trapezium shaped side profile of the housing, wherein a top edge of the opposing side walls of said housing slopes down from a higher end of said housing to an opposing lower end of said housing;
a rectangular lip with an arcuate cutout, said lip extends from the higher end of said housing along a short segment of said sidewalls and covers a portion of said foam structure, wherein the arcuate cutout is configured to receive a heel portion of the heated shoe insole template;
at least one shoe insole template corresponding to a user's left or right foot, wherein the shoe insole template is heated and positioned on the foam structure,
wherein the heated shoe insole template is configured to receive the user's foot, and deforms in response to pressure applied by the user's foot,
wherein upon cooling, the deformed shoe insole template is transformed into a custom fitted insole.

11. The apparatus as recited in claim 10, wherein the shoe insole template plate includes a top layer configured to be breathable, wear-resistant, and non-slip.

12. The apparatus as recited in claim 11, wherein the top layer comprises polyester.

13. The apparatus as recited in claim 10, wherein the shoe insole template plate includes a comfort layer configured to be wear-resistant, soft, comfortable to the user, and capable of shock absorption.

14. The apparatus as recited in claim 13, wherein the comfort layer comprises rubber or ethylene-vinyl acetate (EVA).

15. The apparatus as recited in claim 10, wherein the shoe insole template plate includes a rigid structure core portion positioned on a heel portion of the shoe insole template plate.

16. The apparatus as recited in claim 15, wherein the shoe insole template plate includes a flexible portion surrounding the rigid structure core portion.

17. The apparatus as recited in claim 10, wherein the housing fits snugly into an exterior case.

18. The apparatus as recited in claim 17, wherein the housing is strong enough to support a body weight of the user standing with a foot on the foam structure, wherein the rigid side walls limit lateral expansion of the foam structure when the foam structure is deformed in response to pressure applied by the user's foot.

19. The apparatus as recited in claim 18, wherein a user places their foot on the foam structure such that their heel is proximate the higher end of said housing and their toes are proximate the opposing lower end of said housing, wherein their foot slopes downward from the higher end to the opposing lower end.

* * * * *